United States Patent [19]

Reimann et al.

[11] Patent Number: 5,298,595
[45] Date of Patent: Mar. 29, 1994

[54] PARTLY AROMATIC COPOLYAMIDES OF REDUCED TRIAMINE CONTENT

[75] Inventors: Horst Reimann, Worms; Gunter Pipper, Bad Duerkheim; Hans-Peter Weiss, Mutterstadt; Christoph Plachetta, Limburgerhof; Eckhard M. Koch, Fussgoenheim, all of Fed. Rep. of Germany

[73] Assignee: BASF Aktiengesellschaft, Ludwigshafen, Fed. Rep. of Germany

[21] Appl. No.: 15,844

[22] Filed: Feb. 10, 1993

Related U.S. Application Data

[60] Division of Ser. No. 753,104, Aug. 30, 1991, Pat. No. 5,218,082, which is a continuation of Ser. No. 386,007, Jul. 25, 1989, Pat. No. 5,081,222, which is a continuation of Ser. No. 213,624, Jun. 30, 1988, abandoned.

[30] Foreign Application Priority Data

Jul. 17, 1987 [DE] Fed. Rep. of Germany ....... 3723688

[51] Int. Cl.$^5$ .............................................. C08G 69/14
[52] U.S. Cl. .................... 528/324; 528/331; 528/338; 528/339; 528/340; 528/347
[58] Field of Search ............... 528/324, 331, 338, 339, 528/340, 347

[56] References Cited

U.S. PATENT DOCUMENTS

| | | | |
|---|---|---|---|
| 3,383,369 | 5/1988 | Ridgeway et al. | 260/78 |
| 3,475,387 | 10/1969 | Carter et al. | 528/338 |
| 3,621,089 | 11/1971 | Edgar et al. | 264/211 |
| 3,926,924 | 12/1975 | Edgar et al. | 528/324 |
| 4,218,509 | 8/1980 | Edgar et al. | 528/339 |
| 4,537,949 | 8/1985 | Schmidt et al. | 528/335 |
| 4,540,772 | 9/1985 | Pipper et al. | 528/335 |
| 4,603,166 | 7/1986 | Poppe et al. | 528/339 |
| 4,673,728 | 6/1987 | Nielinger et al. | 528/339 |
| 4,762,910 | 8/1988 | Nielinger et al. | 528/339 |
| 5,081,222 | 1/1992 | Reimann et al. | 528/324 |

*Primary Examiner*—Harold D. Anderson
*Attorney, Agent, or Firm*—Oblon, Spivak, McClelland, Maier & Neustadt

[57] ABSTRACT

Partly aromatic copolyamides contain as essential components

A) 40–90% by weight of units derived from terephthalic acid and hexamethylenediamine, B) 0–50% by weight of units derived from ε-caprolactam and C) 0–60% by weight of units derived from adipic acid and hexamethylenediamine, the components B) and/or C) accounting for a total of not less than 10% by weight of the total units and the copolyamide having a triamine content of less than 0.5% by weight.

10 Claims, 1 Drawing Sheet

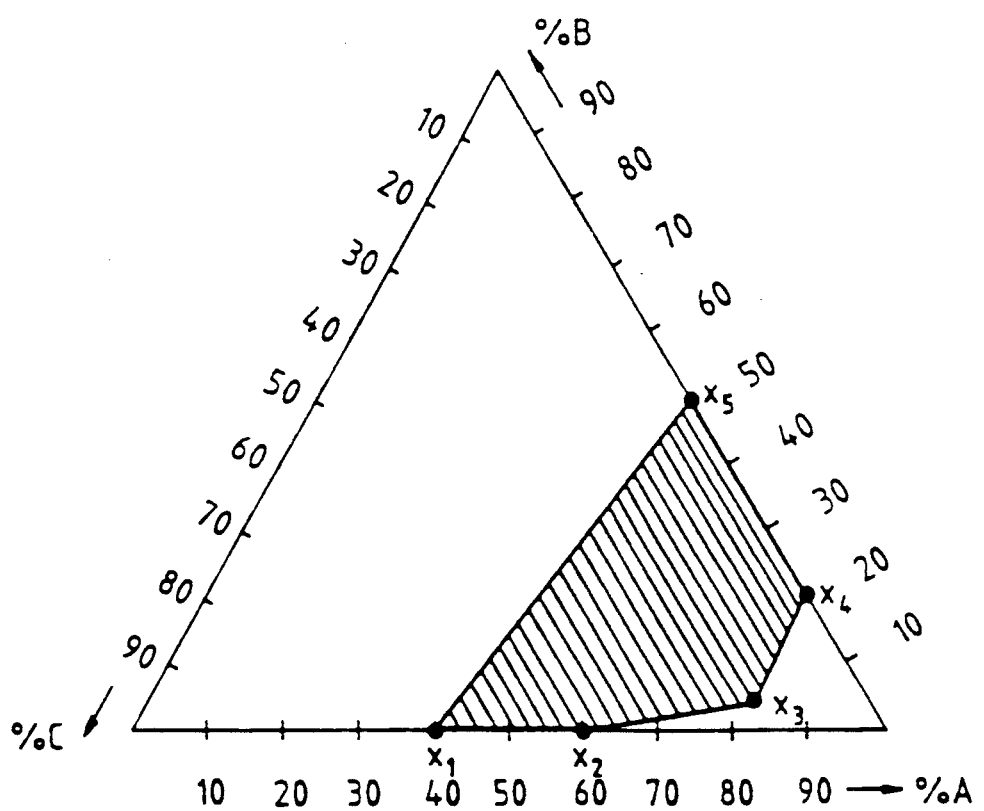

PARTLY AROMATIC COPOLYAMIDES OF REDUCED TRIAMINE CONTENT

This is a Divisional of U.S. Ser. No. 07/753,104 filed Aug. 30, 1991, (now U.S. Pat. No. 5,218,082) which is a continuation of U.S. Ser. No. 07/386,007 filed Jul. 25, 1989 (now U.S. Pat. No. 5,081,222) which is a continuation of U.S. Ser. No. 07/213,624 filed Jun. 30, 1988 abandoned.

The present invention relates to partly aromatic copolyamides containing as essential components A) 40–90% by weight of units derived from terephthalic acid and hexamethylenediamine,
B) 0–50% by weight of units derived from ε-caprolactam and
C) 0–60% by weight of units derived from adipic acid and hexamethylenediamine, the components B) and/or C) accounting for a total of not less than 10% by weight of the total units and the copolyamides having a triamine content of less than 0.5% by weight.

The present invention furthermore relates to the use of such partly aromatic copolyamides for producting fibers, films and moldings, and to moldings obtainable from the partly aromatic copolyamides as essential components.

Polyamides, such as poly-ε-caprolactam and polyhexamethyleneadipamide, are among the long known industrial plastics and have many areas of use. They are distinguished in general by a high degree of hardness, rigidity and good heat distortion resistance, and are in addition resistant to abrasion and wear and to many chemicals.

For some uses, however, it would be desirable if the heat distortion resistance of the polyamides could be further improved, without the remaining mechanical properties being adversely affected.

These requirements are fulfilled by some copolyamides in which a portion of the aliphatic units are replaced by aromatic units, for example copolyamides of adipic acid, terephthalic acid, hexamethylenediamine and ε-caprolactam in any combination.

German Patent 929,151 describes a process for preparing highly polymeric linear polyamides, according to which a mixture of an aromatic para-dicarboxylic acid or an amide-forming derivative thereof, an equivalent amount of an aliphatic or cycloaliphatic diamine and another polyamide-forming starting material, such as a lactam, is condensed under polyamide-forming conditions. According to the examples the preparation of the products takes place in a conventional manner in an auto-clave, which, when using terephthalic acid in the momomer mixture, leads to increased formation of triamines from the hexamethylenediamine also present, which causes strong crosslinking of the product and sustantially adversely affects the application properties thereof.

British Patent 1,114,541 describes ternary copolyamides which contain, in addition to a major proportion of polyhexamethyleneadipamide, 20–40% by weight of units derived from terephthalic acid and hexamethylenediamine and 2–20% by weight of a further polyamide component. The improvement in the heat distortion resistance of these products compared with conventional polyhexamethyleneadipamides is only slight, due to the relatively small proportion of a maximum of 40% by weight of units of terephthalic acid and hexamethylenediamine.

German Laid-Open Application DOS 1,669,455 describes a process for preparing drawn polyamide filaments by melt spinning a copolyamide, where the copolyamide contains a maximum of 40% by weight of units derived from terephthalic acid and hexamethylenediamine, and the preparation of this polyamide is carried out in the presence of not less than 3 mole % of a monofunctional acidic or basic stabilizer. Like the products described in British Patent 1,114,541 the copolyamides listed in German Laid-Open Application DOS 1,669,455 also have heat distortion resistances which are only improved to a slight extent compared with conventional polyamides.

German Laid-Open Application DOS 1,620,997 describes linear fiber-forming amide terpolymers which contain units derived from adipic acid and hexamethylenediamine, from terephthalic acid and hexamethylenediamine and from isophthalic acid and hexamethylenediamine. The incorporation of isophthalic acid in the monomer mixture has the effect that the improved heat distortion resistance obtained by incorporating terephthalic acid is partly lost again. Accordingly, the products described in German Laid-Open Application DOS 1,620,997 are also recommended for use as reinforcing fibers in vehicle tires, i.e. for areas of use where high heat distortion resistance is not required.

German Laid-Open Application DOS 3,407,492 describes a process for preparing copolyamides from adipic acid, terephthalic acid and hexamethylenediamine where the copolyamide contains from 25 to 48% by weight of units of hexamethyleneterephthalamide and where a 40–70% strength aqueous solution of the monomers is heated to not lower than 250° C. in less than 15 minutes and is condensed to give a relative viscosity of up to 1.5–2.4. The water is then distilled off in one or more steps and the resulting precondensate is fully condensed in a conventional manner. According to the description and the examples the residence time of the monomer mixture during the precondensation is preferably 1–10 minutes, and in the examples residence times of 9.5 minutes are given. In the continuous production of the copolyamides described, however, such residence times of more than 1 minute lead to increased formation of triamines which again favor crosslinking of the products formed, leading to difficulties in the continuous production process and adversely affecting the product properties.

EP-A 129, 195 and EP-A 129, 196, describe a process for the continuous preparation of polyamides where aqueous solutions of salts of dicarboxylic acids and diamines, each of 6–18 carbon atoms, are first heated to from 250° to 300° C. under superatmospheric pressure with simultaneous evaporation of water and formation of a prepolymer, prepolymer and vapor are continuously separated, the vapors are rectified and any diamines carried over are recycled, an essential feature of the process being that the aqueous salt solutions are heated under a superatmospheric pressure of 1–10 bar in the course of a residence time of not more than 60 seconds, with the proviso, that on emerging from the evaporation zone the degree of conversion is not less than 93% and the water content of the prepolymer is not more than 7% by weight. It is explained in the description that this procedure substantially reduces triamine formation in the preparation of conventional polyamides, such as poly-ε-caprolactam and polyhexamethyleneadipamide, but no indication is given here that this effect occurs to a significant degree in the preparation of partly aromatic copolyamides which contain not less than 40% by weight of units derived from terephthalic acid and hexamethylenediamine.

It is an object of the present invention to provide a partly aromatic copolyamide which has improved heat distortion resistance and good mechanical properties and which can also be prepared continuously in a simple manner without problems due to crosslinking.

We have found that this object is achieved, according to the invention, with the partly aromatic copolyamide defined at the outset.

The partly aromatic copolyamides according to the invention contain as component A) 40-90% by weight of units derived from terephthalic acid and hexamethylenediamine. A small proportion of terephthalic acid, preferably not more than 10% by weight of the total amount of aromatic dicarboxylic acids used, can be replaced by isophthalic acid or other aromatic dicarboxylic acids, preferably those where the carboxyl groups are in the paraposition.

In addition to the units derived from terephthalic acid and hexamethylenediamine, the copolyamides according to the invention contain units derived from $\epsilon$-caprolactam and/or from adipic acid and hexamethylenediamine.

The proportion of units derived from $\epsilon$-caprolactam is not more than 50% by weight, preferably 20-50% by weight, in particular 25-40% by weight, and the proportion of units derived from adipic acid and hexamethylenediamine is up to 60% by weight, preferably 30-60% by weight, in particular 35-55% by weight.

The copolyamide according to the invention may also contain not only units of $\epsilon$-caprolactam but also units of adipic acid and hexamethylenediamine; in this case, care must be taken to ensure that the proportion of units which are free of aromatic groups is not less than 10% by weight, preferably not less than 20% by weight. The ratio of units derived from $\epsilon$-caprolactam and from adipic acid and hexamethylenediamine is not subject to any particular limitations here.

Those copolyamides whose composition lies within the pentagon determined by the corner points $X_1$ to $X_5$ in a ternary diagram are preferred, the points $X_1$ to $X_5$ being defined as follows:

| | |
|---|---|
| $X_1$ | 40% by weight of units A) |
| | 60% by weight of units C) |
| $X_2$ | 60% by weight of units A) |
| | 40% by weight of units C) |
| $X_3$ | 80% by weight of units A) |
| | 5% by weight of units B) |
| | 15% by weight of units C) |
| $X_4$ | 80% by weight of units A) |
| | 20% by weight of units B) |
| $X_5$ | 50% by weight of units A) |
| | 50% by weight of units B) |

The Figure shows the pentagon defined by these points in a ternary diagram.

Polyamides containing 50-80% by weight, in particular 60-75% by weight, of units derived from terephthalic acid and hexamethylenediamine (units A)) and 20-50% by weight, preferably 25-40% by weight, of units derived from $\epsilon$-caprolactam (units B)) have proven particularly advantageous for many purposes.

In addition to the units A) to C) described above the partly aromatic copolyamides according to the invention can contain minor amounts, preferably not more than 15% by weight, in particular not more than 10% by weight, of further polyamide building blocks as known for other polyamides. These building blocks can be derived from dicarboxylic acids and aliphatic or cycloaliphatic diamines, each of 4-16 carbon atoms, and also from aminocarboxylic acids or corresponding lactams of 7-12 carbon atoms. Suitable monomers of these types are only suberic acid, azelaic acid, sebacic acid and isophthalic acid, as representatives of dicarboxylic acids, butane-1,4-diamine, pentane-1,5-diamine, piperazine, 4,4'-diaminodicyclohexylmethane, 2,2-(4,4'-diaminodicyclohexyl)propane and 3,3'-dimethyl-4,4'-diaminodicyclohexylmethane as representatives of diamines and capryllactam, enanthlactam, omega-aminoundecanoic acid and laurolactam as representatives of lactams and aminocarboxylic acids.

An essential feature of the partly aromatic copolyamide according to the invention is the reduced triamine content of less than 0.5%, preferably less than 0.3%, by weight.

Partly aromatic copolyamides prepared by prior art processes have triamine contents above 0.5% by weight, leading to a deterioration in product quality and to problems in continuous production. A triamine which causes these problems is in particular dihexamethylenetriamine, which is formed from the hexamethylenediamine used in the reaction.

Owing to the lower triamine content the copolymers of the invention, for the same solution viscosity, have lower melt viscosities compared with products of the same composition which have a higher triamine content. This considerably improves both the processability and the product properties.

The melting points of the partly aromatic copolyamides of the invention lie within the range of from 260° C. to above 300° C., this high melting point also being associated with a high glass transition temperature of in general higher than 75, in particular higher than 85° C.

Binary copolyamides based on terephthalic acid, hexamethylenediamine and $\epsilon$-caprolactam and which contain about 70% by weight of units derived from terephthalic acid and hexamethylenediamine have melting points in the region of 300° C. and a glass transition temperature of higher than 110° C.

Binary copolyamides based on terephthalic acid, adipic acid and hexamethylenediamine have, even if the terephthalic acid and hexamethylenediamine units account for only about 55% by weight, melting points of 300° C. and higher, while the glass transition temperature is as high as in the case of binary copolyamides which contain $\epsilon$-caprolactam instead of adipic acid or adipic acid/hexamethylenediamine.

As in the case of conventional polyamides, the glass transition temperature of the partly aromatic copolyamides according to the invention decreases on water uptake, for example on storage in the air. In contrast to conventional polyamides in which the glass transition temperature generally falls to below 0° C. as a result of water uptake, the novel copolyamides have glass transition temperatures significantly above 0° C. even after water uptake (conditioning), which has a very positive effect on the strength and rigidity under standard conditions, e.g. at room temperature.

The preparation of the copolyamides according to the invention can be carried out by the process described in EP-A 129,195 and EP-A 129,196.

According to this process, an aqueous solution of the monomers, i.e. in this case those which form the units A) to C), is heated to 250°–300° C. under superatmospheric pressure with simultaneous evaporation of water and formation of a prepolymer, prepolymer and vapors are then continuously separated, the vapors are rectified and any diamine carried over is recycled. Finally the prepolymer is fed into a polycondensation zone and polycondensed at from 250° to 300° C. and under a superatmospheric pressure of 1–10 bar. In this process it is essential that the aqueous salt solution be heated under a superatmospheric pressure of 1–10 bar in the course of a residence time of not more than 60 seconds, the degree of conversion on emergence from the evaporation zone being advantageously not less than 93% and the water content of the prepolymer being not more than 7% by weight.

The formation of triamines is substantially prevented by using these short residence times.

The aqueous solutions used have as a rule a monomer content of 30–70% by weight, in particular 40–65% by weight.

Advantageously, the aqueous salt solution is fed at 50°–100° C. continuously into an evaporation zone where it is heated to 250°–300° C. under a superatmospheric pressure of 1–10 bar, preferably 2–6 bar. It is of course the case that the temperature used lies above the melting point of the particular polyamide to be prepared.

As mentioned above, it is essential that the residence time in the evaporation zone is not more than 60 seconds, preferably 10–55 seconds, in particular 10–40 seconds.

On emergence from the evaporation zone, the conversion is not less than 93%, preferably 95–98%, and the water content is preferably within the range of 2–5%, in particular 1–3% by weight.

The evaporation zone is advantageously designed as a tube bundle. Particular ability is possessed by those tube bundles where the cross-sections of the individual tubes are tubular and slotlike in a periodically repeating manner.

It has also proven to be of advantage if, before separation of the phases, the mixture of prepolymer and vapor is passed through a tubular mass transfer zone provided with internal fitments which is directly downstream of the evaporation zone while the temperature and pressure conditions used in the evaporation zone are maintained. The internal fitments, e.g. packing such as Raschig rings or metal rings or in particular packing made of wire mesh, provide a large surface area through which the phases, i.e. prepolymer and vapor, are brought into intimate contact. This has the effect of considerably reducing the amount of diamine evolved with the water vapor. As a rule, a residence time of from 1 to 15 minutes is maintained in the mass transfer zone, which advantageously takes the form of a tube bundle.

The two-phase mixture of vapor and prepolymer emerging from the evaporation zone and/or mass transfer zone is separated. Separation generally occurs by itself in avessel due to differences in the physical properties; for this reason the lower part of the vessel is advantageously designed as a polymerization zone. The evolved vapors consist essentially of water vapor and diamines evolved during the evaporation of the water. These vapors are passed into a column and rectified, suitable columns being for example packed columns, bubble cap columns and sieve tray columns having from 5 to 15 theoretical plates. The column is advantageously operated under identical pressure conditions as in the evaporation zone. The diamines present in the vapors are rectified off and recycled into the evaporation zone. It is also possible to feed the diamines to the subsequent polymerization zone. The rectified water vapor is removed at the top of the column.

The prepolymer obtained, which according to its degree of conversion consists essentially of low molecular weight polyamide with or without residual amounts of unconverted salts and as a rule has a relative viscosity of 1.2–1.7, is fed into a polymerization zone. In this zone the melt produced is polycondensed at 250°–330° C., in particular 270°–310° C., under a superatmospheric pressure of 1–10 bar, in particular 2–6 bar. Advantageously, the vapors evolved during this process are rectified in the column together with the abovementioned vapors, and a residence time of 5–30 minutes is preferably maintained in the polycondensation zone. The polyamide obtained in this way, which as a rule has a relative viscosity of 1.2–2.3, is continuously removed from the condensation zone.

In a preferred method, the polyamide obtained in this manner is passed in molten form through a discharge zone with simultaneous removal of residual water contained in the melt. Suitable discharge zones are for example devolatization extruders. The melt thus freed from water is then cast to give extrudates which are granulated. The granules produced are advantageously condensed in the solid phase to the desired viscosity by means of superheated steam at a temperature below the melting point, e.g. at 170°–240° C., the steam obtained at the top of the column being advantageously used for this purpose.

The relative viscosity, measured in a 1% strength solution (1 g/100 ml) in 96% strength by weight $H_2SO_4$ at 23° C., is after the solid phase postcondensation in general within the range from 2.2 to 5.0, preferably from 2.3 to 4.5.

In another preferred method, the polyamide melt discharged from the polycondensation zone is passed into a further polycondensation zone and condensed there with continuous formation of new surfaces at from 285° to 310° C. advantageously under reduced pressure, e.g. of 1–500 mbar, until the desired viscosity is reached. Suitable apparatuses are known as finishers.

Another process which resembles the above is described in EP-A 129, 196, to which reference is made here concerning further details of the process.

The partly aromatic copolyamides according to the invention are distinguished by very good heat distortion resistance coupled with good mechanical properties, the high level properties being maintained by the high glass transition temperature over a relatively wide temperature range even after conditioning.

The novel copolyamides are accordingly suitable for producing fibers, films and molded articles.

EXAMPLES

EXAMPLE 1

An aqueous solution consisting of 35 kg of ε-caprolactam, 55 kg of terephthalic acid, 38.5 kg of hexamethylenediamine and 128.5 kg of water was transported from a heated storage vessel at about 80° C. by means of a metering pump at a rate corresponding to 5 kg of polyamide per hour into a partly horizontal, partly vertical tubular evaporator which was heated by vigorous circulation of a liquid heat transfer medium having a temperature of 295° C. The evaporator was 3 m long and had a capacity of 180 ml and a heat-transferring surface about 1,300 cm² in size. The residence time in the evaporator was 50 seconds. The mixture of prepolymer and water vapor emerging from the evaporator was at 290° C. and was separated in a separator into water vapor and melt. The melt remained in the separator for a further 10 minutes and was then discharged in the form of extrudates by means of a discharge screw having an evaporation zone, the extrudates were solidified in a water bath and then granulated. A pressure of 5 bar was maintained in the separator and the evaporation zone by means of a pressurizing apparatus arranged downstream of the column. The water vapor separated off in the separator was passed into a packed column which comprised about 10 theoretical plates and into the top of which about 1 l/h of condensed vapor was passed to produce reflux. At the top of the column a temperature of 152° C. become established. The water vapor emerging downstream of the let-down valve was condensed and contained less than 0.05% by weight of hexamethylenediamine and less than 0.1% by weight of ε-caprolactam. The bottom product was an aqueous solution of hexamethylenediamine containing, based on polyamide produced, 80% by weight of hexamethylenediamine and from 1 to 3% by weight of ε-caprolactam. This solution was added again to the starting salt solution via a pump before entry into the evaporator.

Downstream of the evaporator the prepolymer had a relative viscosity of 1.25, measured in 96% strength by weight sulfuric acid at 20° C., and a conversion, according to end group analysis, of from 93 to 95%. The bishexamethylenetriamine content was from 0.1 to 0.15% by weight, based on polyamide.

After emerging from the separator, the polymer melt had a very pale self-color and an extremely low bishexamethylenetriamine content of 0.17% and also a relative viscosity of from 1.65 to 1.80.

The product had approximately an equivalent number of carboxyl and amino end groups.

The extractables content (extraction using methanol) was from 3.1 to 3.3% by weight.

In the discharge extruder the melt was then let down to atmospheric pressure and underwent virtually no further condensation during a residence time of less than 1 minute. The granules obtained were condensed by continuous solid phase condensation with superheated steam at 195° C. and a residence time of 30 hours to a final viscosity $n_{rel}$ of 2.50. The extractables content was then 0.2% by weight (methanol extract).

EXAMPLE 2

A salt solution consisting of 63 kg of a salt of adipic acid and hexamethylenediamine, 30 kg of terephthalic acid, 21 kg of hexamethylenediamine and 114 kg of water at about 80° C. was passed in at the top of a vertical evaporator 2 m in length having a capacity of 120 cm³ and a heat-transferring area about 860 cm² in size. The evaporator was heated using a vigorously circulated liquid heat transfer medium at 295° C. The mixture of prepolymer and water vapor emerging from the evaporator was at 288° C.

The degree of conversion was 94% and the residence time in the evaporator was about 40 seconds.

The mixture of prepolymer and water vapor obtained in this way was fed into a mass transfer zone which had been charged with packing and had a surface area of 2 m². The mass transfer zone was configured in such a way that no significant thermal reaction occurred and the melt of prepolymer was brought into intimate contact with the water vapor. The residence time in the mass transfer zone was 0.5 minutes.

After passing the mass transfer zone the mixture of prepolymer and water vapor was separated in a separator similarly to the procedure of Example 1. The rest of the procedure also corresponded to that of Example 1.

The polyamide obtained in this was contained 0.19% by weight of bishexamethylenetriamine. The proportion of hexamethylenediamine left in the bottom product was only from 1 to 2% by weight, based on polyamide.

The extractables content (methanol extract) was from 0.2 to 0.3% by weight.

EXAMPLE 3

A copolyamide consisting of 30% by weight of caprolactam units and 70% by weight of hexamethylenediamine/terephthalate units, (prepared as in Example 1), and having a relative viscosity of 2.42, (measured as described in Example 1), and a melting point of 295° C., (measured by the DSC method), was spun in a commercially available extruder/meltspinning apparatus under the following conditions:

throughput: 1.2 kg/hour
melt temperature: 335° C.
spin speed: 690 m/min
spinnerette: 20 hole; hole diameter 0.2 mm The filament yarns obtained were subsequently hot-drawn:

draw ratio: 1:2.4
drawing temperature 120° C. (godet) and 140° C. (hot plate)
drawing speed: 735 m/min The filament yarns had the following properties:

total count: 112/20 dtex
tensile strength: 4.65 cN/dtex (4.6)
elongation at break: 20% (36)
initial modulus: 60 cN/dtex
dyeability with anionic dyes: comparable with polyhexamethyleneadipamide (nylon-6,6)
Fastnesses (light, wash, perspiration) comparable with nylon-6,6
wet strength: 87 (87)
UV stability (Xenotest, 28 days): 69% (52%)
heat treatment (3 hours at 190° C.): 37% (40%)

The values given in parentheses are those for nylon-6,6.

We claim:

1. A partly aromatic copolyamide, consisting essentially of:

A) 40–90% by weight of monomer units derived from terephthalic acid and hexamethylene diamine, B) monomer units derived from ε-caprolactam in an amount up to 50% by weight, and C) in an amount up to 60% by weight monomer units derived from adipic acid and hexamethylene diamine, and wherein the sum of components B) and C) is not less than 10% by weight of the total units, and wherein said copolyamide has a triamine content of less than 0.5% by weight, a melting point in the range from 260° C. to above 300° C. and a glass transition temperature higher than 75° C.

2. The copolyamide of claim 1, containing 20–50% by weight monomer units derived from ε-caprolactam.

3. The copolyamide of claim 1, containing 25–40% by weight of monomer units derived from ε-caprolactam.

4. The copolyamide of claim 1, containing 30–60% by weight of monomer units derived from adipic acid and hexamethylene diamine.

5. The copolyamide of claim 1, containing 35–55% by weight of monomer units derived from adipic acid and hexamethylene diamine.

6. The copolyamide of claim 1, containing less than 0.3% by weight triamine.

7. The copolyamide of claim 1, wherein component B), component C) or the sum of components B) and C) is not less than 20% by weight.

8. The copolyamide of claim 1, having a glass transition temperature higher than 85° C.

9. A molded article comprising the copolyamide of claim 1.

10. The molded article of claim 9, wherein said molded article is a film or fiber.

* * * * *